(12) United States Patent
Kato

(10) Patent No.: US 6,805,021 B2
(45) Date of Patent: Oct. 19, 2004

(54) BYWIRE SYSTEM SHIFT LEVER DEVICE FOR VEHICLES

(75) Inventor: Hironori Kato, Tokyo (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/382,073

(22) Filed: Mar. 5, 2003

(65) Prior Publication Data

US 2004/0118237 A1 Jun. 24, 2004

(Under 37 CFR 1.47)

(51) Int. Cl.[7] .......................... H01H 25/04; F16H 59/00
(52) U.S. Cl. ................. 74/473.12; 74/473.3; 74/480 R; 74/491
(58) Field of Search .......................... 74/471 R, 473.12, 74/473.3, 479.01, 480 R, 491

(56) References Cited

U.S. PATENT DOCUMENTS 6,336,373 B1 * 1/2002 Murai et al. ............. 74/473.23

* cited by examiner

Primary Examiner—William C. Joyce
(74) Attorney, Agent, or Firm—Brinks Hofer Gilson & Lione

(57) ABSTRACT

A bywire system shift lever device for vehicles includes a base member, a lever member to be driven by an operating element, an electric motor provided on the lever member, a transmission mechanism to transmit a rotation of a rotating shaft to the lever member, a first position detecting sensor for supplying first position signals representing the operating angle of the lever member, and a second position detecting sensor for supplying second position signals. Consequently the electric motor is controlled by the second position signals and thus a predetermined sensory resistance is provided to the operating element by a force of the rotating shaft of the electric motor applied via transmission mechanisms.

20 Claims, 4 Drawing Sheets

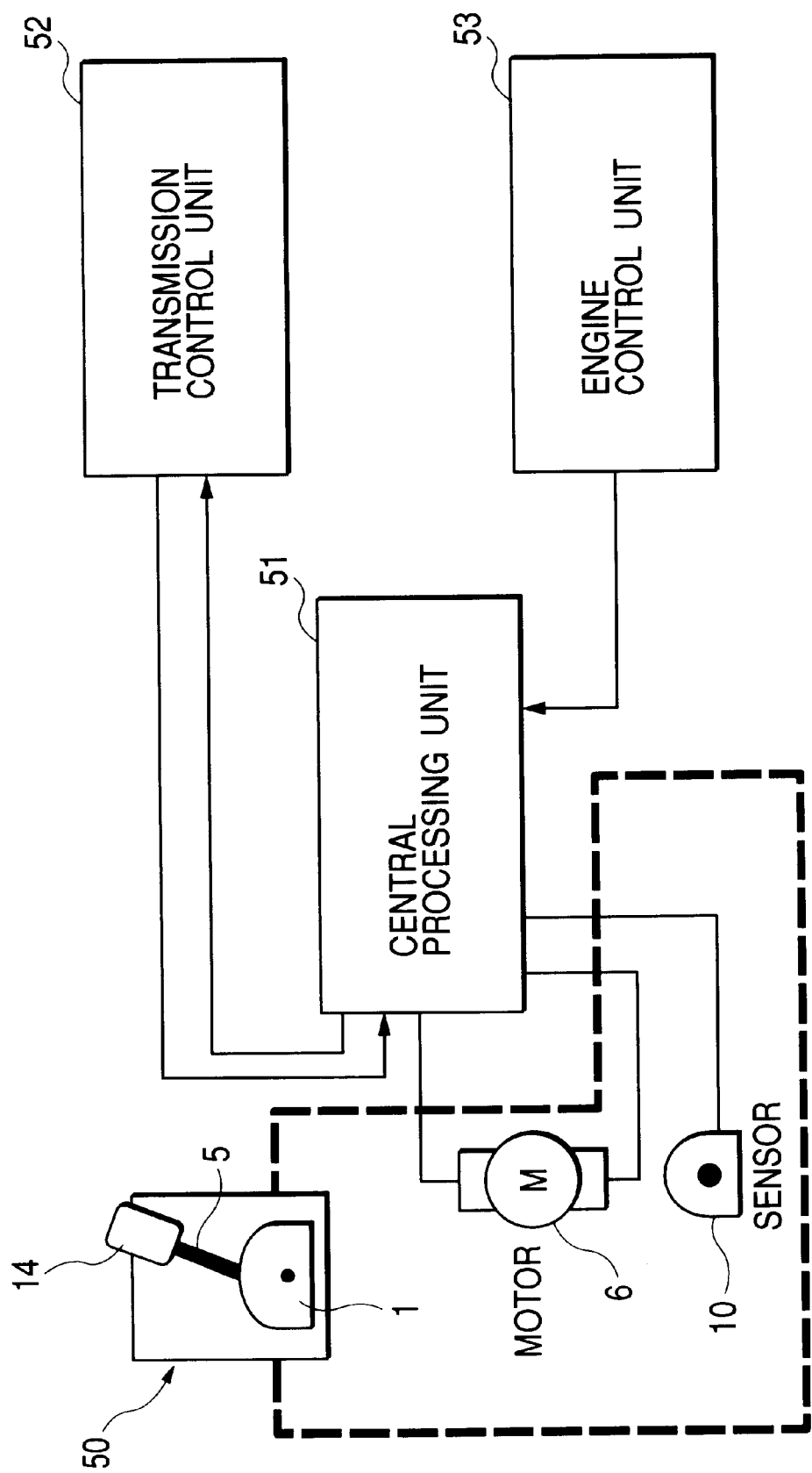

US 6,805,021 B2

BYWIRE SYSTEM SHIFT LEVER DEVICE FOR VEHICLES

TECHNICAL FIELD

The present invention relates, generally, to a bywire system shift lever device for vehicles and, more specifically, to a bywire system shift lever device suitable for automatic vehicles.

BACKGROUND

Hitherto, the shift lever device for automatic vehicles includes a transmission switching unit utilizing a mechanical link mechanism. However, in order to cope with demand for computerization of vehicle-mounted equipment, a bywire system transmission switching unit has been developed in which the switching position of the shift lever is detected by a position sensor. An actuator such as a solenoid and a motor is driven in accordance with output signals from the position sensor to drive a transmission switching fork is proposed.

The shift lever device for automatic vehicles also requires a sensory resistance mechanism for providing an adequate sensory resistance to the shift lever when the shift lever is moved from one shift position (for example, the drive position: D) to another shift position (for example, the neutral position: N) in order to ensure good operability of the shift lever.

The bywire system shift lever device for vehicles of the prior art is provided with the sensory resistance mechanism described above. However, there is such disadvantage that when the sensory resistance mechanism has a problem, such sensory resistance mechanism tends to be locked in position so that a change of the shift position by the shift lever is disabled. In addition, the complex construction of the sensory resistance mechanism results in upsizing of the sensory resistance mechanism.

In shift lever devices for automatic vehicles having a bywire system transmission switching unit, it is not necessary to provide a large sized and complex link mechanism between the driver's seat and the engine room, and what have to be done is just to distribute several pieces of electric wires, whereby flexibility of design of the vehicle may be significantly increased.

SUMMARY OF THE INVENTION

In order to solve the problem described above, an object of the bywire system shift lever device for vehicles according to the present invention is to provide a compact bywire system shift lever device for vehicles, in which reliable change gear operation is achieved.

The bywire system shift lever device for vehicles according to the present invention includes: a base member; a lever member mounted on the base member so as to be capable of being driven within a predetermined range of angles and having an operating element; the lever member being driven by operating the operating element; an electric motor mounted on the lever member; a transmission mechanism for transmitting rotation of a rotating shaft of the electric motor to the lever member; a first position detecting sensor for supplying first position signals representing the operating angle of the lever member; and a second position detecting sensor for supplying second position signals representing the operation of the lever member via the transmission mechanism, and a rotational force of the rotating shaft of the electric motor is controlled by the second position signals so that a predetermined sensory resistance is provided to the operating element by a force of the rotating shaft of the electric motor applied via the transmission mechanism.

In this arrangement, since the sensory resistance providing mechanism is constructed of the electric motor and the transmission mechanism for transmitting the rotation of the rotating shaft of the electric motor to the lever member, the structure is simplified, and thus the compact shift lever device for vehicles may be provided.

In the bywire system shift lever device for vehicles according to the present invention, the transmission mechanism includes: a wire the both ends of which are attached to the base member; and a pulley secured to the rotating shaft of the electric motor, and the wire is wound around the pulley between both ends thereof, the winding position of the wire wound around the pulley is moved while rotating the pulley by the operation of the lever member, and the rotating shaft of the electric motor is rotated in the direction opposite from the direction of rotation of the pulley, so that a predetermined sensory resistance is provided to the operating element.

In this arrangement, since the construction of the transmission mechanism is such that the wire is simply wound around the pulley, the pulley can be moved as if the wire slides over the outer peripheral surface of the pulley in some cases. Therefore, even when the rotating shaft of the electric motor cannot be rotated due to a defect thereof, the first position signals representing the operating angle of the lever member may be supplied from the first position detecting sensor by moving the lever member and thus the reliable operation of the lever member is achieved.

The bywire system shift lever device for vehicles according to the invention is characterized in that a supporting unit having a semi-circular sliding surface, the diameter of which is larger than the diameter of the pulley, is provided on the base member, in that the outer peripheral surface of the pulley and the sliding surface of the supporting unit are faced toward each other, and in that the wire is positioned along the sliding surface of the supporting unit so that the winding position of the wire on the pulley moves along the sliding surface.

In this arrangement, since a speed reducing mechanism is constructed by the pulley, which is smaller in diameter, and the sliding surface, which is larger in diameter, a small electric motor having small rotational torque may be arranged and thus a compact bywire system shift lever device for vehicles being blessed with stable operation may be provided at a low cost.

The bywire system shift lever device according to the present invention is characterized in that a spring member is attached at one of the ends of the wire, and the spring member is provided with an adjusting member for adjusting the tensility thereof.

In this arrangement, the tensility of the wire may be adjusted to a predetermined force easily by the adjusting member attached to the spring member, and thus a predetermined stable sensory resistance may be achieved.

The bywire system shift lever device for vehicles according to the invention is characterized in that the electric motor is disposed on the side of the operating element of the lever member, and the first position detecting sensor is disposed within the moving range of the lever member on the base member on the fulcrum side of the lever member.

In this arrangement, the device may be downsized, and the position of the lever member within the predetermined angular range may be reliably detected by the first position detecting sensor.

The bywire system shift lever device for vehicles according to the present invention is characterized in that the first position detecting sensor is constructed of a potentiometer, and the second position detecting sensor is constructed of an encoder.

Since the potentiometer and the encoder are low in price, the cost-effective bywire system shift lever device for vehicles may be provided.

The bywire system shift lever device for vehicles according to the present invention is characterized in that the wire wound around the pulley moves as if it slides over the outer peripheral surface of the pulley by operating the operating element when the transmission mechanism fails to be driven or when the electric motor fails to be rotated, so that the lever member can actuate the first position detecting sensor, and thus the electric motor can be controlled by the first position signals from the first position detecting sensor.

In this arrangement, the bywire system shift lever device for vehicles in which the position of the shift lever can be reliably detected within a predetermined angular range by the first position detecting sensor even when the transmission mechanism or the electric motor has a problem, which may occur on occasion.

BRIEF DESCRIPTION OF THE DRAWINGS

FIG. 4 is a block diagram illustrating a control system of the embodiment of the bywire system shift lever device for vehicles according to the present invention.

DESCRIPTION OF THE EMBODIMENTS

Figure 1:
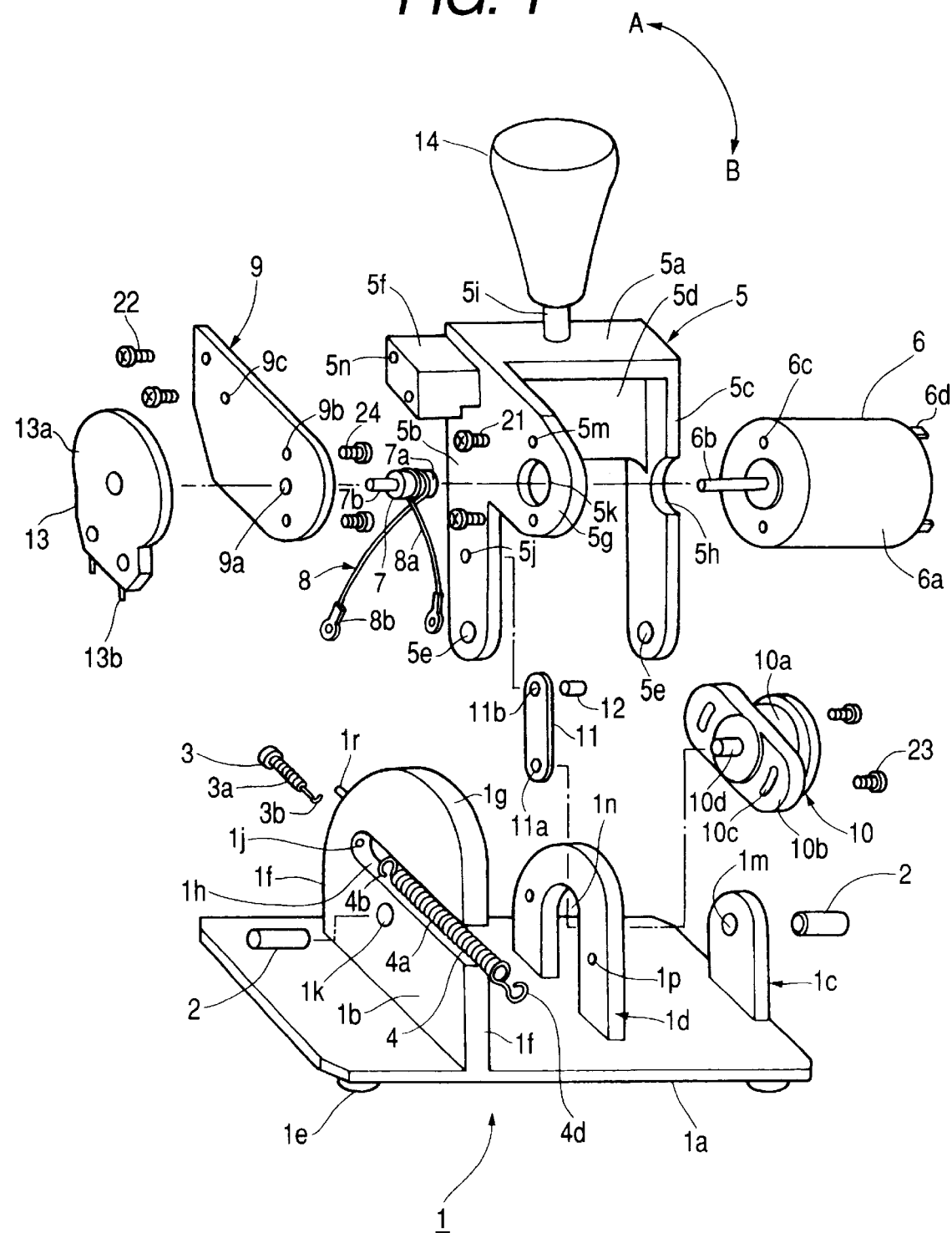
FIG. 1 is an exploded perspective view illustrating an embodiment of the bywire system shift lever device for vehicles according to the present invention.
Figure 2:
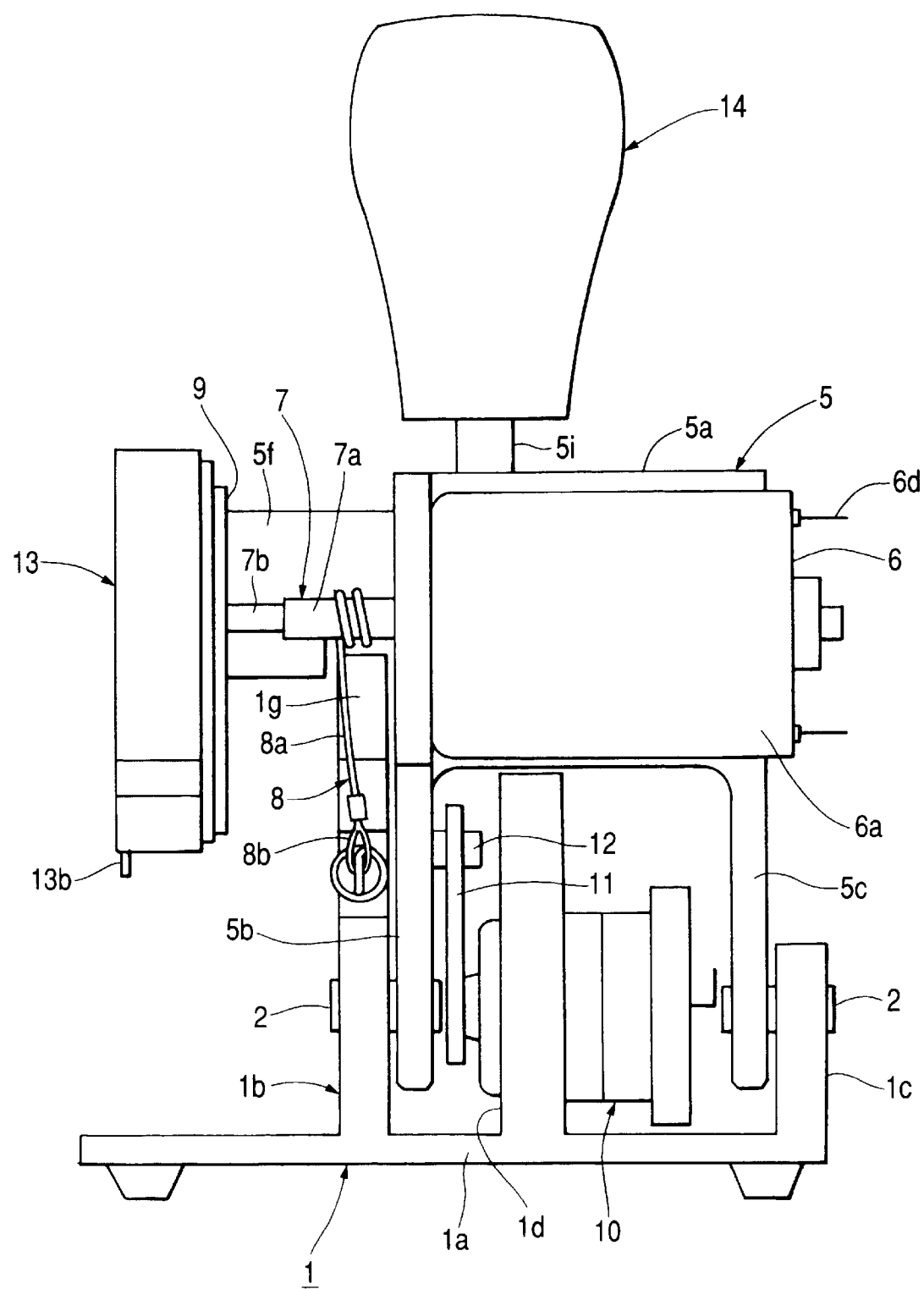
FIG. 2 is a plan view illustrating an embodiment of the bywire system shift lever device for vehicles according to the present invention.
Figure 3:
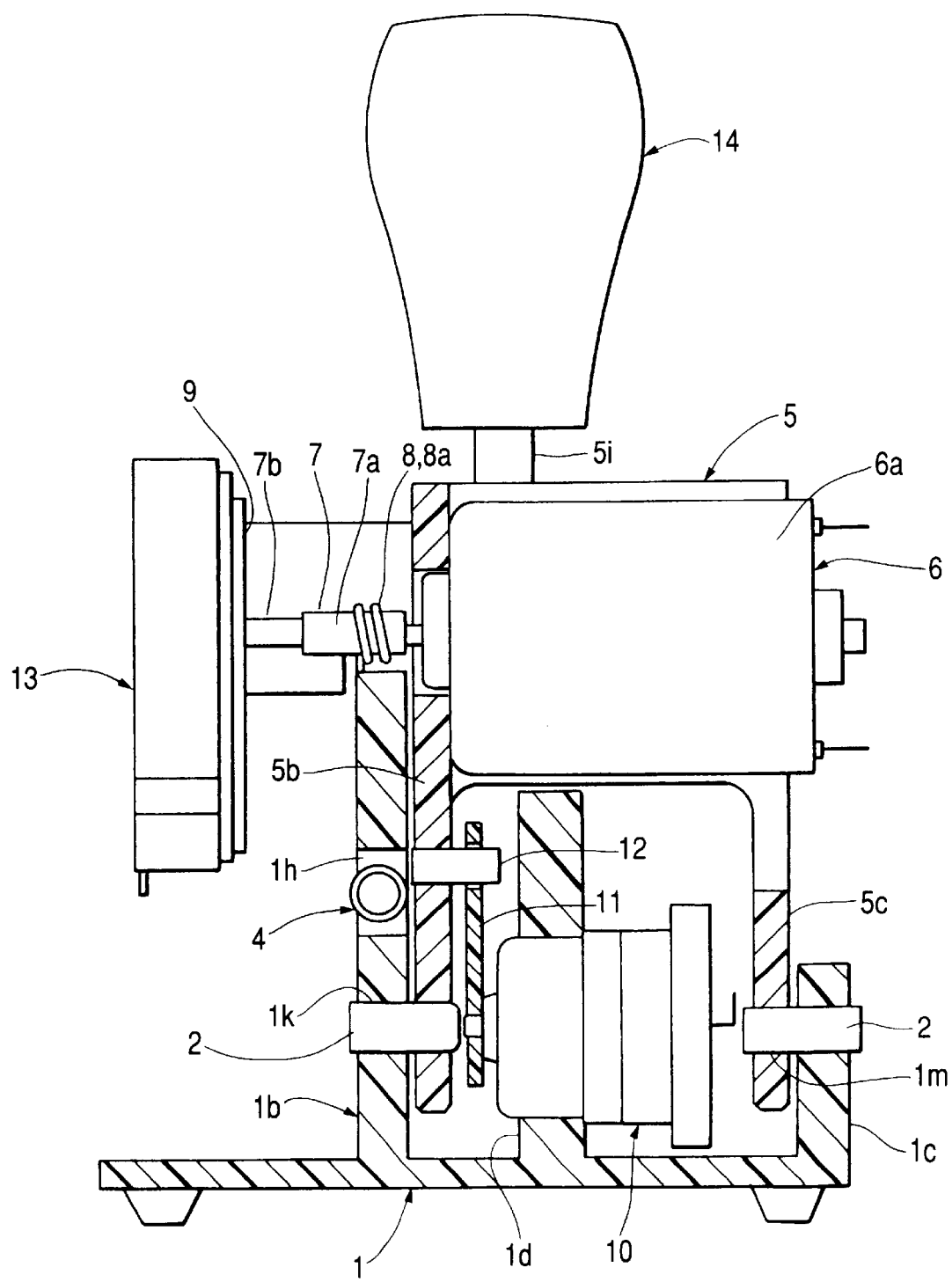
FIG. 3 is a cross sectional view illustrating a principal portion of the embodiment of the bywire system shift lever device for vehicles according to the present invention.

Referring to FIGS. 1–3, base member 1 being formed, for example, of metallic material or of synthetic resin material, and processed by cutting or molding, includes a substantially rectangle plate-shaped base plate portion 1a. A first supporting portion 1b extends outwardly and vertically with respect to one of the surfaces of the base plate portion 1a in parallel with the shorter side of the base plate portion 1a. A second supporting portion 1c is disposed in parallel with the first supporting portion 1b at a predetermined distance away from the position of the first supporting portion 1b and is smaller than the first supporting portion 1b. A third supporting portion 1d is disposed at a predetermined position between the first supporting portion 1b and the second supporting portion 1c in parallel with the first supporting portion 1b. A mounting station 1e of a predetermined configuration is disposed in the vicinity of the four corners of the other surface of the base plate portion 1a.

The first supporting portion 1b is formed to have a predetermined thickness and includes a pair of side surfaces 1f disposed opposingly in parallel with each other. A substantially semi-circular sliding surface 1g is provided between the respective extremities of the pair of side surfaces 1f. A slit portion 1h is provided in parallel with the shorter side of the base plate portion 1a and is formed from one side surface 1f toward the other side surface 1f. A screw hole 1j passes through the portion between the bottom surface of the slit portion 1h and the other side surface 1f. A circular mounting hole 1k provided substantially at the center of the first supporting portion 1b, and a mounting portion 1r such as a screw hole or a projection formed on the sliding surface 1g is provided on the other side surface 1f.

The substantially semi-circular sliding surface 1g of the first supporting portion 1b constitutes a large-diameter second pulley.

The first supporting portion 1b may be formed integrally with the base plate portion 1a, as shown, or may be formed separately from the base plate portion 1a where the first supporting portion 1b is a separate portion, it is secured to the base plate portion 1a by a suitable means, such as screwing or the like.

The second supporting portion 1c is formed to have a predetermined thickness and has a circular mounting hole 1m formed substantially at the center of the second supporting portion 1c. The central axis of the mounting hole 1m of the second supporting portion 1c and the central axis of a mounting hole 1k of the first supporting portion 1b are coaxial.

The second supporting portion 1c, maybe formed integrally with the base plate portion 1a, as shown, or may be formed separately from the base plate portion 1a where the second supporting portion 1c is a separate portion, it is secured to the base plate portion 1a by suitable means such as, for example, a screw.

The third supporting portion 1d is formed to have a predetermined thickness, and includes a substantially semi-circular hole 1n substantially at the substantially center of the third supporting portion 1d and a pair of screw holes 1p are disposed at predetermined positions so as to interpose the hole 1n.

The third supporting portion 1d may be formed integrally with the base plate portion 1a, as shown, or may be formed separately from the base plate portion 1a where the third supporting portion 1d is a separate portion, it is secured to the base plate portion 1a by suitable means, such as a screw or the like.

The first rotary mounting member 2 as a first mounting pin is formed, for example, of metallic material processed by cutting into a column shape having a predetermined diameter and length. Two first rotary mounting members 2 are provided, which are, for example, rotatably mounted to the mounting hole 1k of the first supporting portion 1b and the mounting hole 1m of the second supporting portion 1c, respectively. The respective extremities are disposed so as to project between the first supporting portion 1b and the second supporting portion 1c. The axial centers of these two first rotary mounting members 2 are disposed coaxially.

The tensile screw member 3 includes a threaded portion 3a having a predetermined diameter, and a mounting portion 3b provided at the one of the ends of the threaded portion 3a. The tensile screw member 3 is engaged within the screw hole 1j of the first supporting portion 1b of the base plate member 1, and, in such an engaged state, the mounting portion 3b is projected into the slit portion 1h.

The tensile screw member 3 is adapted to adjust the amount of projection into the slit portion 1h.

A tensile spring member 4, for example, a coiled spring, has a predetermined wire diameter and coil diameter, includes a spring portion 4a having a predetermined tensility and a pair of mounting portions 4b provided at both ends of the spring portion 4a. The tensile spring member 4 is disposed on the side of the opening of the slit portion 1h of the first supporting portion 1b, and one of mounting portions 4b is, for example, hooked to the mounting portion 3b of the tensile screw member 3 so as not to come off easily. In this state, the other mounting portion 4b is disposed within the slit portion 1h.

Also, in this state, the tensile screw member 3 constitutes a so-called adjusting member for adjusting tensility of the tensile spring member 4 in such a manner that the mounting portion 3b of the tensile screw member 3 is moved back and forth in the slit portion 1h by rotating the tensile screw member 3.

A lever member 5, being formed, for example, of metallic material, synthetic resin material, or the like, processed by cutting or molding, includes: a plate shaped base portion 5a; a pair of first and second arm portions 5b and 5c extending vertically from both longitudinal ends of the base portion 5a; a supporting portion 5d for connecting the pair of first and second arm portions 5b and 5c and simultaneously supporting the pair of first and the second arm portions 5b and 5c; first securing holes 5e formed at the coaxial positions in the vicinity of the respective free ends of the pair of first and second arm portions 5b and 5c; a substantially square first mounting portion 5f projecting outward from the outer surface of the first arm portion 5b on the root side thereof; substantially semi-circular second mounting portion 5g projecting from the root side of the first arm portion 5b outwardly so as to be flush with the outer surface of the first arm portion 5b; an arcuate recess 5h provided at a predetermined position of the longitudinal side of the second arm portion 5c; and a column-shaped third mounting portion 5i projecting vertically outward from the substantially central portion of the surface of the base portion 5a.

The first arm portion 5b is provided with a second securing hole 5j at the position further from the free end of the first arm portion 5b than the first securing hole 5e. The second mounting portion 5g is provided with an insertion hole 5k formed substantially at the center of the second mounting portion 5g. A plurality of mounting holes 5m are provided at predetermined positions so as to interpose the insertion hole 5k.

The first mounting portion 5f is formed with a plurality of screw holes 5n on the outer end surface of the first mounting portion 5f.

The first rotary mounting member 2 is firmly fixed to the respective securing holes 5e of the pair of the first and the second arm portions 5b and 5c of the lever member 5, for example, by press-fitting or by calking. The fixation of the rotary mounting member 2 allows the lever member 5 to rotate in the directions indicated by an arrow A and an arrow B (FIG. 1) about the securing hole 5e as a fulcrum. In other words, the lever member 5 is disposed between the first supporting portion 1b and the second supporting portion 1c, and mounted to the first supporting portion 1b and the second supporting portion 1c by the first rotary mounting member 2 so as to rotate within a predetermined angular region.

An electric motor 6 that functions as an actuator includes a cylindrical main body 6a in which an electromagnetic coil (not shown) and the like are stored. A drive shaft 6b that functions as a rotating shaft is provided so as to project outward from the main body 6a. A plurality of screw holes 6c are formed around the drive shaft 6b, and a plurality of terminals 6d are provided so as to project outward from the main body 6a.

The electric motor 6 is secured to the second mounting portion 5g in such a manner that the drive shaft 6b is inserted through the insertion hole 5k of the second mounting portion 5g of the lever member 5 so as to project outward while aligning a mounting hole 5m on the second mounting portion 5g and the screw hole 6c. The electric motor 6 is secured with the screws 21 to mount the electric motor 6 on the lever member 5.

A pulley member 7 that functions as a first pulley has a small diameter and is formed, for example, of metallic material, processed by cutting, and includes a cylindrical winding portion 7a. A drive shaft 7b is coaxial with the winding portion 7a and has a diameter smaller than that of the winding portion 7a. A circular recess (not shown) is formed in the winding portion 7a and is coaxial with the winding portion 7a.

The diameter of the pulley member 7 is configured to be smaller than that of the sliding surface 1g of the first supporting portion 1b constituting the second pulley having a larger diameter, and the ratio of the diameter is, for example 1:13.

The pulley member 7 is disposed in such a manner that the drive shaft 6b of the electric motor 6 is disposed within the recess (not shown) and the pulley member 7 is secured to the drive shaft 6b by suitable means such as screwing or the like.

A wire 8 is formed, for example, of metallic wire material, and includes a linear portion 8a of a predetermined length and a pair of mounting portions 8b provided at both ends of the linear portion 8a.

The wire 8 has a predetermined tensile strength, for example, 10 kg, and is adapted to be broken (disconnected) when it is pulled with tensility in excess of this predetermined tensile strength.

The wire 8 is secured in such a manner that one of the mounting portions 8b is secured to the mounting portion 1r of the first supporting portion 1b, for example, with a screw (not shown), and the other mounting portion 8b is engaged by the other mounting portion 4b of the tensile spring member 4, for example, in a hooked state. A linear portion 8a of the wire 8 is disposed in a state of being wound by a plurality of turns (for example, four turns), on the winding portion 7a of the pulley member 7, and the linear portion 8a other than the linear portion 8a wound around the winding portion 7a is disposed in a state of being in contact with the sliding surface 1g of the first supporting portion 1b. In other words, the wire 8 is disposed in such a manner that the linear portion 8a between a pair of mounting portions 8b disposed at both ends thereof is wound around the pulley member 7.

A mounting substrate 9, being formed, for example, of metallic material or synthetic resin material, processed by pressing or molding, is shaped like a plate, and includes a through hole 9a formed at a predetermined position, a plurality (two, for example) of first mounting holes 9b formed at predetermined positions, and a plurality (two, for example) of second mounting holes 9c.

The mounting substrate 9 is secured to a screw hole 5n of the first mounting portion 5f by disposing a mounting substrate 9 in contact with the outer surface of the first mounting portion 5e of the lever member 5, inserting a screw 22 through a plurality (two, for example) of the first mounting holes 9b, and fastening the screw 22.

In this state, the drive shaft 7b of the pulley member 7 into the through hole 9a, and the extremity of the drive shaft 7b projects outward from the surface of the mounting substrate 9.

An absolute angle detecting sensor 10 as a first position detecting sensor is, for example, a potentiometer, and includes a substantially cylindrical body portion 10a in which a detecting portion (not shown) constructed, for example, of a resistive element or slide element for detecting the absolute angle, a pair of flanges 10b formed at the front end of the body portion 10a in a state of a rib, mounting holes 10c formed at substantially the centers of the respective flanges 10b, a detecting shaft 10d projecting outward from the front end of the body portion 10a, and a plurality of terminals (not shown) projecting outward from predetermined positions on the body portion 10a.

The absolute angle detecting sensor 10 is mounted to the third supporting member 1d by disposing the mounting holes 10c so as to opposed to a pair of screw holes 1p of the third supporting portion 1d of the base member 1 in contact manner, and fastening a screw 23.

In this case, a detecting shaft 10d projects outward from the inside of the hole 1n of the third supporting portion 1d, and is disposed in such a manner that the axial center of the detecting shaft 10d is coaxially disposed with the axial centers of the two aforementioned first rotary mounting members 2.

A driving member 11, being formed, for example, of metallic plate material, processed by pressing into a substantially elliptic shape, includes circular first mounting holes 11a formed respectively in the vicinity of both ends thereof, and a circular second mounting hole 11b.

The driving member 11 is disposed inside one of the first arm portions 5b of the lever member 5 in parallel with the first arm portion 5b, and the detecting shaft 10d of the absolute angle detecting sensor 10 is secured into the first mounting hole 11a by means of suitable means such as press-fitting.

The second rotary mounting member 12 as a second mounting pin, being formed, for example, of metallic material processed by cutting into a column shape, has a predetermined diameter and length. The second rotary mounting member 12 is secured in such a manner that one of the ends thereof is fixed to the second mounting hole 11b of the driving member 11 by suitable means such as press-fitting, and the other end is fixed to the second securing hole 5j of the first arm portion 5b in suitable means such as press-fitting.

When the lever member 5 is rotated within a predetermined angular range in this state, the driving member 11 rotates about the detecting shaft 10d of the absolute angle detecting sensor 10 together with the lever member 5. Rotation of the driving member 11 allows the detecting shaft 10d to rotate, and accordingly, the absolute angle is supplied from the absolute angle detecting sensor 10 as output signals toward the outside.

An encoder 13 as the second position detecting sensor includes a main body 13a in which a code plate (not shown) and a slide element (not shown) are accommodated, a plurality of terminals 13b projecting outward from the main body 13a, an operating hole (not shown) provided at substantially the center of the main body 13a, and a plurality of screw holes (not shown) formed in the vicinity of the operating hole (not shown).

The encoder 13 is attached to the mounting substrate 9 with a screw 24, which allows the driving shaft 7b of the pulley member 7 to be inserted into the operating hole (not shown), and the operating hole and the driving shaft 7b are secured by suitable means.

An operating knob 14 as the operating element, being formed, for example, of synthetic resin material, processed by molding into a substantially conical shape, includes a circular recess (not shown) along the axis of the operating knob 14.

A third mounting portion 5i of the lever member 5 is inserted into the recess of the operating knob 14, and the third mounting portion 5i is fixed into the recess by suitable means. By operating the operating knob 14 in the direction indicated by the arrows A and B, the lever member 5 is operated and driven about the first rotary mounting member 2 as a fulcrum.

In the bywire system shift lever device for vehicles according to the present invention, the electric motor is employed as an actuator. However, the actuator is not limited to the electric motor as far as it is rotary type electric equipment having a predetermined rotational torque.

In the bywire system shift lever device for vehicles according to the present invention, the potentiometer is employed as the first position detecting sensor. However, the first position detecting sensor is not limited to the potentiometer as far as it is the absolute angle detecting sensor that can detect the absolute angle.

In the bywire system shift lever device for vehicles according to the present invention, the encoder is employed as the second position detecting sensor. However, the second position detecting sensor is not limited to the encoder as far as it is the position detecting sensor that can detect predetermined position, speed, and rotational direction.

Referring now to FIG. 4, a block diagram of a control system for controlling the bywire system shift lever device for vehicles relating to the present bywire system shift lever device for vehicles will now be described.

As shown in FIG. 4, the control system of the bywire system shift lever device for vehicles includes: a shift lever device portion 50 including a base member 1 and a lever member 5 having the operating knob 14 disposed on the base member 1; an electric motor 6 mounted on the lever member 5; the absolute angular position detecting sensor 10 for supplying the first position signals in accordance with the operating angle of the lever member 5; a central processing unit 51 for controlling the electric motor 6 by the first position signals from the absolute angle detecting sensor 10 representing the shift position of the lever member 5; a transmission control unit 52 to which the output signals including the first position signals representing the shift position supplied from the central processing unit 51 are supplied; and an engine control unit 53 for supplying control signals such as the number of revolutions of the engine (not shown) to the central processing unit 51.

The output signals representing the shift position of the lever member 5 that is controlled by the transmission from the transmission control unit 52 is supplied to the central processing unit 51.

The central processing unit 51 is also supplied with the output signals from the encoder 13 (See FIG. 1) serving as the second position detecting sensor, and such signals supplied from the encoder 13 to the central processing unit 51 detects and controls the rotational direction of the electric motor 6.

Flow of signals in the above-described control system will be schematically described. For example, when the lever member 5 is operated and positioned to the drive (D) position, first position signals representing that the lever member 5 is at the drive (D) position emitted from the absolute angle detecting sensor 10 are supplied to the central processing unit 51, and by such first position signals, the central processing unit 51 outputs drive position locking signals for locking the electric motor 6 at the predetermined position, and also the first position signals representing that the lever member 5 is at the drive (D) position to the transmission control unit 52.

In this case, sift status signals representing that the transmission from the transmission control unit 52 is controlled at the drive (D) position and signals representing the number of revolution of the engine (not shown) supplied from the engine control unit 53 are supplied to the central processing unit 51.

Accordingly, the vehicle is adapted to be controlled stably at the drive (D) mode.

Almost the same control is performed even when the lever member 5 is, for example, at a parking (P) position, a reverse (R) position, or a second gear position, and thus the description will not be made.

The operation of the bywire system shift lever device for vehicles will now be described. The bywire system shift lever device for vehicles is intended to be used in automatic vehicles, and the shift positions of the lever member 5 may be set from the first position at the furthest position (the front of the vehicle) represented by the arrow A in FIG. 1 sequentially to the sixth position on the near side (the rear of the vehicle) represented by the arrow B.

In this case, the first position is the parking (P) position, the second position is the reverse (R) position, the third position is the neutral (N) position, the fourth position is the drive (D) position, the fifth position is the second gear position, and the sixth position is the first gear position. The positions from the first position to the sixth position are equally spaced by a predetermined distance (the same angle), or set at predetermined intervals.

The lever member 5 is adapted to be positioned at these first to sixth positions by applying a predetermined force.

The normal operation in such condition will now be described.

The description will be started from the state in which the operating knob (operating element) 14 provided at the lever member 5 is positioned at the N position, which is the third position. When the operating knob 14 is disposed at the N position, the absolute angle detecting sensor 10 outputs signals representing the absolute angle of the operating knob 14 disposed at the N position.

When the operating knob 14 disposed at the N position is operated in the direction indicated by the arrow B (clockwise), the absolute angle detecting sensor 10 detects that the output signals indicating the absolute angle of the operating knob 14 located at the N position and that the operating knob 14 is going to be operated in the direction indicated by the arrow B. When such detection signals are detected, a voltage is applied to the drive shaft 6b of the electric motor 6 so as to rotate the same in the direction indicated by the arrow A (counterclockwise), which is opposite from the direction indicated by the arrow B.

Detection and control of the rotation of the drive shaft 66 in the direction indicated by the arrow A is performed by output signals supplied by rotating the encoder 13 by the drive shaft 7b of the pulley member 7 secured to the drive shaft 6b. In other words, by employing the encoder 13 as the second position detecting sensor, the rotational direction and the rotational speed of the pulley member 7 mounted to the electric motor 6 are detected and supplied so that the electric motor 6 can be controlled by such output signals.

When a voltage that rotates the drive shaft 6b of the electric motor 6 as predetermined manner is applied, the pulley member 7 rotates counterclockwise at a predetermined torque (for example, a rotational torque of about 2 kg). In this case, the wire 8 wound around the pulley member 7 is applied with a counterclockwise rotational torque. However, if the operating force to move the operating knob 14 in the direction indicated by the arrow B (for example, about 3 kg) is larger than the rotational torque, the operating knob 14 is moved to the drive (D) position, which is the fourth position corresponding to the next position in the direction indicated by the arrow B.

At this moment, the winding position of the wire 8 moves over the sliding surface 1g of the first supporting portion 1b in the direction indicated by the arrow B while rotating the pulley member 7. Since the drive shaft 6b of the electric motor 6 is going to rotate counterclockwise in response to rotation of the pulley member 7 on the sliding surface 1g, such rotation of the drive shaft 6b may provide a predetermined sensory resistance to the operating knob 14.

When the absolute angel detecting sensor 10 detected that the operating knob 14 has moved to the drive (D) position, the output signals from the absolute angle detecting sensor 10 locks the operating knob 14 at the D position by a predetermined torque.

As described above, the operation of the operating knob 14 to which a predetermined sensory resistance is applied is not limited to the operation of the operating knob 14 from the third position to the fourth position as described above, and is also applicable to the operation of the operating knob 14 between any adjacent positions from the first to the sixth position in the direction indicated by the arrow A or in the direction indicated by the arrow B as a matter of course. The pulley member 7 is constructed in such a manner that the winding position of the wire 8 wound around the pulley member 7 always moves over the sliding surface 1g while rotating the pulley member 7 by operating the lever member 6 when the operating knob 14 is operated between any positions described above.

Subsequently, the operation to be performed when the transmission mechanism or the electric motor of the bywire system shift lever device for vehicles has a problem, such as catching of a foreign substance into the transmission mechanism or burning phenomenon of sliding element of the motor, which may occur on occasions, will be described. In other words, the operation performed when the pulley member 7 cannot be rotated as usual will be described.

The operation in such a case will also be described from the state in which the operating knob (operating element) 14 provided on the lever member 5 is located at the N position, which corresponds to the third position.

As in the case described above, when the operator tries to operate the operating knob 14 located at the N position in the direction indicated by the arrow B (clockwise) from this state, as described above, the normal (correct) action of the transmission mechanism or the electric motor may not be performed due to such a problem that may occur on occasions.

In this state, when the operator tries to operate the operating knob 14 in the direction indicated by the arrow B (clockwise) with an operating force (5 kg, for example) in excess of a predetermined operating force (about 2 kg, for example), the pulley member 7 secured to the drive shaft 6b of the electric motor 6 does not rotate by itself (pulley member 7) due to the problem, and the wire 8 wound around the pulley member 7 moves as if it slides over the outer surface of the pulley member 7.

The sliding movement of the wire 8 over the outer surface of the pulley member 7 allows the operating knob 14 to be moved in the direction indicated by the arrow B, so that the operating knob 14 may be moved to the D position corresponding to the intended fourth position.

The operation of the operating knob 14 as described above is not limited to the operation of the operating knob 14 from the third position to the fourth position as described above, and the wire 8 also moves as if it slides over the outer surface of the pulley member 7 between any adjacent positions from the first to the sixth position in the direction indicated by the arrow A or in the direction indicated by the arrow B as a matter of course.

Although the operation that the wire 8 moves as if it slides over the outer surface of the pulley member 7 when there is a problem has been described in the above described embodiment, it is also possible to construct the device in such a manner that the wire 8 is broken by applying an operating force, for example, of more than about 10 kg to the operating knob 14 to enable the operation of the operating knob 14, as a matter of course.

As described above, since the bywire system shift lever device for vehicles according to the invention includes: a base member; a lever member mounted on the base member so as to be capable of being driven within a predetermined range of angles and having an operating element; the lever member being driven by operating the operating element; an electric motor mounted on the lever member; a transmission mechanism for transmitting rotation of the rotating shaft of the electric motor to the lever member; the first position detecting sensor for supplying first position signals representing the operating angle of the lever member; and the second position detecting sensor for supplying second position signals representing the operation of the lever member via the transmission mechanism, and a rotational force of the rotating shaft of the electric motor is controlled by the second position signals, so that a predetermined sensory resistance is provided to the operating element by a force of the rotating shaft of the electric motor applied via the transmission mechanism. Consequently, the sensory resistance providing mechanism is constructed of the electric motor and the transmission mechanism for transmitting the rotation of the rotating shaft of the electric motor to the lever member, and thus the structure is simplified and the compact shift lever device for vehicles may be provided.

In addition, in the bywire system shift lever device for vehicles according to the present invention, the transmission mechanism includes: a wire the both ends of which are attached to the base member; and a pulley secured to the rotating shaft of the electric motor, and the wire is wound around the pulley between both ends thereof, the winding position of the wire wound around the pulley is moved while rotating the pulley by the operation of the lever member, and the rotating shaft of the electric motor is rotated in the direction opposite from the direction of rotation of the pulley, so that a predetermined sensory resistance is provided to the operating element. Consequently, the construction of the transmission mechanism is such simple that the wire is simply wound around the pulley, and thus the pulley can be moved as if the wire slides over the outer peripheral surface of the pulley in some cases. Therefore, even when the rotating shaft of the electric motor cannot be rotated due to a defect thereof, the first position signals representing the operating angle of the lever member may be supplied from the first position detecting sensor by moving the lever member and thus the reliable operation of the lever member is achieved.

What is claimed is:

1. A bywire system shift lever device for vehicles comprising:
    a base member;
    a lever member mounted on said base member so as to be capable of being driven within a predetermined range of angles and having an operating element;
    the lever member being driven by operating said operating element;
    an electric motor mounted on said lever member;
    a transmission mechanism for transmitting rotation of a rotating shaft of said electric motor to said lever member;
    a first position detecting sensor for supplying first position signals representing an operating angle of said lever member; and
    a second position detecting sensor for supplying second position signals representing the operation of said lever member via said transmission mechanism,
    wherein a rotational force of said rotating shaft of said electric motor is controlled by said second position signals so that a predetermined sensory resistance is provided to said operating element by a force of said rotating shaft of said electric motor applied via said transmission mechanism by controlling said electric motor.

2. A bywire system shift lever device for vehicles according to claim 1, wherein said transmission mechanism comprises a wire having first and second ends and attached to said base member at said first and second ends, and wherein said bywire system further comprises a pulley secured to said rotating shaft of said electric motor, said pulley having first and second ends,
    wherein said wire is wound on said pulley between said first and second ends thereof so that the operation of said lever member allows a winding position of said wire wound on said pulley to move over said pulley while rotating, and
    wherein said rotating shaft of said electric motor is controlled in an opposite direction from a direction of rotation of said pulley so that said predetermined sensory resistance is provided to said operating element.

3. A bywire system shift lever device for vehicles according to claim 2, wherein said pulley has a diameter, wherein said base member is provided with a supporting portion having a semi-circular sliding surface that has a diameter, wherein said diameter of said semi-circular sliding surface is larger than said diameter of said pulley,
    wherein an outer peripheral surface of said pulley is faced toward said semi-circular sliding surface of said supporting portion, and
    wherein said wire is disposed along said sliding surface of said supporting portion so that a winding position of said wire on said pulley moves along said semi-circular sliding surface.

4. A bywire system shift lever device for vehicles according to claim 3, further comprising a spring member attached on one of said first and second ends of said wire, wherein said spring member is provided with an adjusting member for adjusting a tensility thereof.

5. A bywire system shift lever device for vehicles according to claim 4, wherein said electric motor is disposed on a side of said operating element, and said first position detecting sensor is disposed within said predetermined range of angles of said lever member on a fulcrum side of said lever member.

6. A bywire system shift lever device for vehicles according to claim 5, wherein said wire slides over an outer peripheral surface of said pulley by operating said operating element when said transmission mechanism fails to be driven or when said electric motor fails to be rotated, so that said lever member can actuate said first position detecting sensor, whereby said electric motor can be controlled by said first position signals from said first position detecting sensor.

7. A bywire system shift lever device for vehicles according to claim 4, wherein said wire slides over an outer peripheral surface of said pulley by operating said operating element when said transmission mechanism fails to be driven or when said electric motor fails to be rotated, so that said lever member can actuate said first position detecting sensor, whereby said electric motor can be controlled by said first position signals from said first position detecting sensor.

8. A bywire system shift lever device for vehicles according to claim 3, wherein said electric motor is disposed on a side of said operating element, and said first position detecting sensor is disposed within said predetermined range of angles of said lever member on the fulcrum side of said lever member.

9. A bywire system shift lever device for vehicles according to claim 8, wherein said wire slides over an outer peripheral surface of said pulley by operating said operating element when said transmission mechanism fails to be driven or when said electric motor fails to be rotated, so that said lever member can actuate said first position detecting sensor, whereby said electric motor can be controlled by said first position signals from said first position detecting sensor.

10. A bywire system shift lever device for vehicles according to claim 3, wherein said wire slides over an outer peripheral surface of said pulley by operating said operating element when said transmission mechanism fails to be driven or when said electric motor fails to be rotated, so that said lever member can actuate said first position detecting sensor, whereby said electric motor can be controlled by said first position signals from said first position detecting sensor.

11. A bywire system shift lever device for vehicles according to claim 2, further comprising a spring member attached on one of said first and second ends of said wire, wherein the spring member comprises an adjusting member for adjusting a tensility thereof.

12. A bywire system shift lever device for vehicles according to claim 11, wherein said electric motor is disposed on a side of said operating element and said first position detecting sensor is disposed within said predetermined range of angles of said lever member on a fulcrum side of said lever member.

13. A bywire system shift lever device for vehicles according to claim 12, wherein said wire slides over an outer peripheral surface of said pulley by operating said operating element when said transmission mechanism fails to be driven or when said electric motor fails to be rotated, so that said lever member can actuate said first position detecting sensor, whereby said electric motor can be controlled by said first position signals from said first position detecting sensor.

14. A bywire system shift lever device for vehicles according to claim 11, wherein said wire wound slides over an outer peripheral surface of said pulley by operating said operating element when said transmission mechanism fails to be driven or when said electric motor fails to be rotated, so that said lever member can actuate said first position detecting sensor, whereby electric motor can be controlled by the first position signals from said first position detecting sensor.

15. A bywire system shift lever device for vehicles according to claim 2, wherein said wire slides over an outer peripheral surface of said pulley by operating said operating element when said transmission mechanism fails to be driven or when said electric motor fails to be rotated, so that said lever member can actuate said first position detecting sensor, whereby said electric motor can be controlled by said first position signals from said first position detecting sensor.

16. A bywire system shift lever device for vehicles according to claim 2, wherein said electric motor is disposed on a same side of said lever member as said operating element, and said first position detecting sensor is disposed within said predetermined range of angles of said lever member on said base member on a fulcrum side of said lever member.

17. A bywire system shift lever device for vehicles according to claim 16, wherein said wire slides over an outer peripheral surface of said pulley by operating said operating element when said transmission mechanism fails to be driven or when said electric motor fails to be rotated, so that said lever member can actuate said first position detecting sensor, whereby said electric motor can be controlled by said first position signals from said first position detecting sensor.

18. A bywire system shift lever device for vehicles according to claim 2, wherein said wire slides over an outer peripheral surface of said pulley by operating said operating element when said transmission mechanism fails to be driven or when said electric motor fails to be rotated, so that said lever member can actuate said first position detecting sensor, whereby said electric motor can be controlled by said first position signals from said first position detecting sensor.

19. A bywire system shift lever device for vehicles according to claim 1, wherein said electric motor is disposed on a side of said operating element of said lever member, and said first position detecting sensor is disposed within said predetermined range of angles of said lever member on a fulcrum side of said lever member.

20. A bywire system shift lever device for vehicles according to claim 1, wherein said first position detecting sensor comprises a potentiometer, and said second position detecting sensor comprises an encoder.

* * * * *

UNITED STATES PATENT AND TRADEMARK OFFICE
CERTIFICATE OF CORRECTION

| | |
|---|---|
| PATENT NO. | : 6,805,021 B2 |
| APPLICATION NO. | : 10/382073 |
| DATED | : October 19, 2004 |
| INVENTOR(S) | : Hironori Kato |

Page 1 of 1

It is certified that error appears in the above-identified patent and that said Letters Patent is hereby corrected as shown below:

<u>In the Claims</u>

Column 12, in claim 5, line 58, immediately after "operating element" delete "," (comma).

Column 13, in claim 12, line 3, immediately after "operating element" insert --,-- (comma).

Column 14, in claim 14, line 7, after "sensor, whereby" insert --said--.

Column 14, in claim 14, line 8, before "first position signal" delete "the" and substitute --said-- in its place.

Signed and Sealed this

Twenty-seventh Day of March, 2007

JON W. DUDAS
*Director of the United States Patent and Trademark Office*